United States Patent
Dillingham et al.

(10) Patent No.: US 8,719,356 B2
(45) Date of Patent: May 6, 2014

(54) METHODS, SYSTEMS, AND COMPUTER READABLE MEDIA FOR MONITORING DELIVERABILITY OF ELECTRONIC MAIL BASED ON SUBSCRIBER AND SEED DELIVERABILITY DATA

(75) Inventors: Jeremy K. Dillingham, Lafayette, CO (US); Peter J. Nocchiero, Denver, CO (US); Christopher J. Oake, Denver, CO (US); Sean E. Jordan, Broomfield, CO (US); George Marvin Bilbrey, Lafayette, CO (US); Sheela Isac, Broomfield, CO (US)

(73) Assignee: Return Path, Inc, New York, NY (US)

( * ) Notice: Subject to any disclaimer, the term of this patent is extended or adjusted under 35 U.S.C. 154(b) by 158 days.

(21) Appl. No.: 13/449,153

(22) Filed: Apr. 17, 2012

(65) Prior Publication Data
US 2013/0275522 A1    Oct. 17, 2013

(51) Int. Cl.
*G06F 15/16* (2006.01)
(52) U.S. Cl.
USPC ......................................................... 709/206
(58) Field of Classification Search
USPC ......................................................... 709/206
See application file for complete search history.

(56) References Cited

U.S. PATENT DOCUMENTS

| | | | |
|---|---|---|---|
| 7,076,533 B1 | 7/2006 | Knox et al. | |
| 7,260,837 B2 | 8/2007 | Abraham et al. | |
| 7,392,435 B2 | 6/2008 | Bezuidenhout | |
| 7,574,478 B2 | 8/2009 | Mittelstaedt et al. | |
| 7,593,995 B1 | 9/2009 | He et al. | |
| 7,680,892 B2 | 3/2010 | Knox et al. | |
| 7,693,950 B2 | 4/2010 | Foulger et al. | |
| 7,779,080 B2 | 8/2010 | Pang | |
| 8,069,210 B2 * | 11/2011 | Gillum et al. | 709/206 |
| 8,417,787 B1 * | 4/2013 | Muir | 709/206 |
| 2002/0032602 A1 * | 3/2002 | Lanzillo et al. | 705/14 |
| 2004/0030597 A1 | 2/2004 | Bibas | |
| 2004/0073617 A1 | 4/2004 | Milliken et al. | |
| 2006/0031303 A1 * | 2/2006 | Pang | 709/206 |

(Continued)

FOREIGN PATENT DOCUMENTS

| | | |
|---|---|---|
| CN | 101674547 A | 3/2010 |
| EP | 2493218 A1 | 8/2012 |

(Continued)

OTHER PUBLICATIONS

R. Kulka, "Can Seed Lists Measure Email Deliverability? A Practical Guide by the Nunmbers," Jul. 19, 2012, 5 pages.

*Primary Examiner* — Kostas Katsikis
(74) *Attorney, Agent, or Firm* — Blank Rome LLP (57) ABSTRACT

A system monitor delivery of electronic mail based on subscriber and seed deliverability data. Seed deliverability data is received that includes information indicating a number of email messages associated with an email campaign that are delivered to a folder associated with one or more intended recipients of the email campaign based on a sampling of seed accounts. The seed accounts are not associated with actual recipients of the email campaign. Subscriber deliverability data is received that includes information indicating a number of email messages associated with the email campaign that are delivered to a folder associated with the one or more intended recipients of the email campaign based on one or more subscriber accounts. The seed accounts are associated with a subset of human recipients of the email campaign. One or more deliverability metrics are determined based on the seed deliverability data and the subscriber deliverability data.

21 Claims, 3 Drawing Sheets

(56) References Cited

U.S. PATENT DOCUMENTS

| | | |
|---|---|---|
| 2006/0031306 A1 | 2/2006 | Haverkos |
| 2006/0112166 A1* | 5/2006 | Pettigrew et al. ............. 709/206 |
| 2006/0194595 A1 | 8/2006 | Myllynen et al. |
| 2006/0253537 A1 | 11/2006 | Thomas |
| 2008/0016172 A1* | 1/2008 | Schiavone et al. ............ 709/206 |
| 2008/0147816 A1 | 6/2008 | Damm et al. |
| 2008/0244027 A1* | 10/2008 | Foulger et al. ................ 709/206 |
| 2008/0320093 A1* | 12/2008 | Thorne ......................... 709/206 |
| 2009/0028183 A1* | 1/2009 | Landers et al. ................ 370/466 |
| 2009/0077182 A1* | 3/2009 | Banjara et al. ................ 709/206 |
| 2009/0265440 A1* | 10/2009 | Blumberg et al. ............. 709/206 |
| 2010/0042694 A1* | 2/2010 | Mittelstaedt et al. ......... 709/206 |
| 2010/0250682 A1 | 9/2010 | Goldberg et al. |
| 2012/0030302 A1 | 2/2012 | Lund et al. |
| 2012/0191546 A1* | 7/2012 | Phelan et al. ............... 705/14.67 |

FOREIGN PATENT DOCUMENTS

| | | |
|---|---|---|
| JP | 2009015502 A | 1/2009 |
| JP | 2009087150 A | 4/2009 |
| WO | WO-2009006544 A2 | 1/2009 |
| WO | WO-2010145159 A1 | 12/2010 |

* cited by examiner

ISP Statistics — 400

| United States | Asia-Pacific | Canada | Europe | Reference Accounts |

Sort by: Inbox: Low to High ▷

| % Inbox | Spam | Missing | ISP | Source | First Delivered | Last Delivered | Complaints | Duplicates |
|---|---|---|---|---|---|---|---|---|
| 95.4 | 4.6 | 0.0* | Yahoo! ⑦ | ▷ | 01/31/12 \| 05:59 | 01/31/12 \| 12:33 | - | 0 |
| 100 | 0.0 | 0.0 | AOL ⑦ | ▷ | 01/31/12 \| 06:52 | 01/31/12 \| 06:52 | - | 0 |
| 100 | 0.0 | 0.0 | ATT ⑦ | ▷ | 01/31/12 \| 07:17 | 01/31/12 \| 07:17 | - | 0 |
| 100 | 0.0 | 0.0 | BellSouth ⑦ | ▷ | 01/31/12 \| 06:52 | 01/31/12 \| 06:52 | - | 0 |
| 100 | 0.0 | 0.0 | Cablevision ⑦ | ▷ | 01/31/12 \| 07:26 | 01/31/12 \| 07:38 | - | 0 |
| 100 | 0.0 | 0.0 | Comcast ⑦ | ▷ | 01/31/12 \| 06:52 | 01/31/12 \| 06:52 | - | 0 |
| 100 | 0.0 | 0.0 | Compuserve ⑦ | ▷ | 01/31/12 \| 06:52 | 01/31/12 \| 06:54 | - | 0 |
| 100 | 0.0 | 0.0 | Cox ⑦ | ▷ | 01/31/12 \| 06:52 | 01/31/12 \| 06:52 | - | 0 |
| 100 | 0.0 | 0.0 | Earthlink ⑦ | ▷ | 01/31/12 \| 07:17 | 01/31/12 \| 07:17 | - | 0 |
| 100 | 0.0 | 0.0* | Gmail ⑦ | ▷ | 01/31/12 \| 06:04 | 01/31/12 \| 06:31 | - | 0 |

FIG. 4

METHODS, SYSTEMS, AND COMPUTER READABLE MEDIA FOR MONITORING DELIVERABILITY OF ELECTRONIC MAIL BASED ON SUBSCRIBER AND SEED DELIVERABILITY DATA

BACKGROUND OF THE INVENTION

1. Field of the Invention

The present invention relates to monitoring the deliverability of email messages for a list of intended recipients and more particularly to such a method using subscriber and seed deliverability data.

2. Description of the Related Art

Bulk senders of electronic mail (email) messages often send a large number of copies of an email message to many different recipients as part of an "email campaign". Email campaigns may be used for commercial or non-commercial purposes but often target a specific set of recipients and are designed to achieve a particular goal (e.g., increase sales volume, boost donations, etc.).

When a bulk email sender (hereinafter, "sender") creates an email campaign, it is desirable for the sender to be able to measure the effectiveness of that email campaign through monitoring various deliverability statistics for the email messages associated with a campaign. One example of a deliverability statistic that may be monitored includes an indication of the number, or percentage, of intended recipients who actually received the email in their inboxes as a proportion of the total number of intended recipients of the campaign.

One method for measuring the success of an email campaign includes using seed deliverability data to monitor email placement. For example, the sender may maintain its own set of email accounts (seed accounts) with various email service providers, such as ISPs, and include those email address accounts in their email campaign. The sender may then monitor its seed email accounts as samples to determine how the email campaign messages were delivered. One drawback to using seed data only is that it typically only provides a statistical result derived from a small sample of email addresses. Another drawback is that those seed accounts are otherwise unused and are not used to send email, subscribe to information lists, or given to third parties. Because seed accounts are not associated with actual human users, they cannot interact with the emails providing "engagement" metrics which could impact folder placement of messages. For example, seed accounts cannot add to an address book, open an email, click through an email, forward an email, or reply to an email. As a result, seed accounts may not be representative of actual email accounts.

Another method used to monitor email placement includes using subscriber deliverability data associated with actual human recipients of the campaign. Conventionally, subscriber data has been obtained from larger ISPs, such as Yahoo!, Gmail, AOL, and Hotmail, and email folder placement for those ISPs has been determined based on a categorization as either globally good, and delivered to the recipient's inbox, or categorized as globally bad, and either placed in the recipient's junk folder or discarded by the ISP. However, ISPs are increasingly filtering email using individual user-level settings, which take into account user behavior, such as engagement with the email (e.g., opened, deleted, read, etc).

Therefore, a drawback to using subscriber data only is that the visibility of a sender's email campaign may be limited or, in other words, the subscriber data may not be representative of all intended recipients. Because a sufficient quantity of data is often only available from a few large ISPs, there is often not enough subscriber data to provide comprehensive monitoring of all of the ISPs that may be associated with the intended recipients of the campaign. Another drawback is that identifying which campaigns are important from a list of campaigns is difficult. For example, with subscriber campaigns, a sender might receive a large number of non-important campaigns to sift through to see result. Yet another drawback is that while subscriber data can only show folder placement data (e.g., inbox or bulk) if the email was placed in a recipient's mailbox, seed data can show "missing" emails. Missing is an indication that there is a full block at the ISP, which would result in zero subscriber data being available.

One prior art solution for identifying email campaigns is described in U.S. Patent Publication No. 2009/0077182 to Banjara et al. Banjara discloses a system and method for identifying email campaigns using special custom email message headers, called x-headers. An email sender adds an x-header that identifies the sending company and perhaps also the email campaign. The email sender may then ask the ISP of the mail recipient whether the ISP blocked any emails with a specified x-header. One significant limitation of this x-header based system is that it requires coordination between the email sender, the ISPs of the recipients, and a specialized email delivery services provider employed by the sender. All parties must also be informed about the content of the x-header in advance of the email campaign, and it cannot determine if email messages were opened or simply diverted to a spam folder. (See paragraphs [0033]-[0034] of Banjara.) Banjara is hereby incorporated by reference.

Accordingly, there is a need to overcome the shortcomings described above regarding subscriber-only deliverability data or seed-only deliverability data in order to achieve broader and more accurate monitoring of email marketing campaigns.

SUMMARY AND OBJECTS OF THE INVENTION

Accordingly, it is an object of the invention to monitor deliverability of electronic mail based on subscriber deliverability data, seed deliverability data, and a data feed that is received directly from an ISP.

Those and other objects and features of the present invention are accomplished by a tangible computer readable medium having stored thereon computer executable instructions that, when executed by the processor of a computer, performs steps. The steps include receiving seed deliverability data that includes information indicating a number of email messages associated with an email campaign that are delivered to a folder associated with one or more intended recipients of the email campaign based on a sampling of seed accounts, wherein the seed accounts are not associated with actual recipients of the email campaign. Additionally, subscriber deliverability data is received, where the subscriber deliverability data includes information indicating a number of email messages associated with the email campaign that are delivered to a folder associated with the one or more intended recipients of the email campaign based on one or more subscriber accounts, wherein the subscriber accounts are associated with a subset of human recipients of the email campaign. One or more deliverability metrics are determined based on the seed deliverability data and the subscriber deliverability data.

With those and other objects, advantages, and features of the invention that may become hereinafter apparent, the nature of the invention may be more clearly understood by reference to the following detailed description of the invention, the appended claims, and the several drawings attached herein.

DETAILED DESCRIPTION OF THE PREFERRED EMBODIMENTS

Several preferred embodiments of the invention are described for illustrative purposes, it being understood that the invention may be embodied in other forms not specifically shown in the drawings. In order to provide monitoring of delivery of email based on a combination of subscriber and seed deliverability data, both subscriber deliverability data and seed deliverability data are received and used to determine one or more deliverability metrics. Advantages of the subject matter described herein include broader and more accurate monitoring of email marketing campaigns.

Seed deliverability data is information indicating a number of email messages associated with an email campaign that were delivered to a folder associated with one or more intended recipients of the email campaign based on a sampling of seed accounts, wherein the seed accounts are not associated with actual recipients of the email campaign. It is appreciated that seed email accounts and seed data are used exclusively by the system to collect and tabulate statistics for monitoring email deliverability and are not used to send any outbound email. Seed accounts do not correspond with real users, but instead are "dummy" accounts created by the system for monitoring of delivery data for an email campaign. Thus, "seeding" includes using an active email monitoring program to track and report email deliverability at the receiving ISPs. This monitoring provides the sender (e.g., a marketer or anyone deploying an email campaign) with deliverability metrics, such as whether email associated with a monitored campaign was sent to a user's inbox folder, the user's junk folder, or was discarded by the ISP without being delivered to any user folder (this may also be referred to herein as "missing").

For the process of seeding in accordance with the present invention, a plurality of email accounts (e.g., 10-20) may be created at each of one or more ISPs/domains. Senders are then provided with the email addresses of the seed email accounts at each of the domains so that the sender may insert (or "seed") the email addresses into their outbound email campaigns. The deliverability of the email campaign may then be monitored using these seed accounts. As used herein, the deliverability rate is a way to quantify the predicted percentage of e-mails delivered to the inbox. The deliverability rate is different from a delivery rate, which is the numbers of e-mails sent minus the number of emails returned, bounced, or otherwise monitored not delivered to the inbox. Senders may also login to monitor their practices using the system, which may generate and provide a report summary or detailed deliverability metrics on a per-campaign basis and/or a per-ISP basis over a predetermined period of time.

Subscriber deliverability data (or simply, "subscriber data") includes deliverability data associated with actual customer email accounts (e.g., a subset of the e-mail sender's real customers) or, in other words, information indicating a number of email messages associated with the email campaign that are delivered to a folder associated with the one or more intended recipients of the email campaign based on one or more subscriber accounts, wherein the seed accounts are associated with a subset of actual recipients of the email campaign. It is appreciated that deliverability data is not limited to folder placement data but also includes other "treatment" data relating to how messages are treated (i.e., what actions are taken on the message after delivery). For example, deliverability data/treatment data may include whether the message is tagged as a high priority message or whether the message is trusted (e.g., associated with a trust mark). Subscriber deliverability data may be gathered from a group or panel of users who have opted-in to share this data. For example, subscriber data may be obtained from users who have agreed to terms of service agreements that allow the system to pull deliverability data from the user's email client program. It is appreciated that subscriber deliverability data may be provided anonymously and without any personally identifying information. Thus, the system can analyze deliverability data for a subset of real customers in order to provide delivery metrics based on how email was delivered to actual recipients of the campaign rather than based on the seed accounts. As will be described below, the subject matter described herein discloses a method for using seed data and subscriber data to determine one or more deliverability statistics associated with a monitored campaign.

Figure 1:
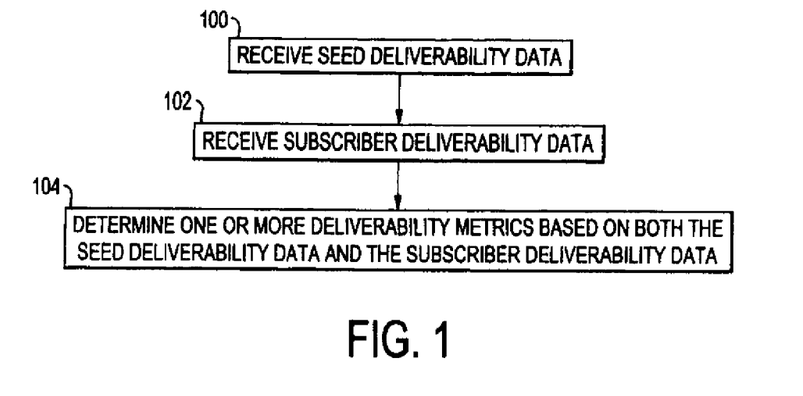
FIG. 1 is a flow chart of an exemplary method for monitoring deliverability of electronic mail based on subscriber and seed deliverability data in accordance with an embodiment of the invention.

FIG. 1 is a flow chart of an exemplary method for monitoring delivery of electronic mail based on subscriber and seed deliverability data according to an embodiment of the subject matter described herein. Referring to FIG. 1, at step 100, seed deliverability data is received. Seed deliverability data includes information indicating a number of email messages associated with an email campaign that are delivered to a folder associated with one or more intended recipients of the email campaign based on a sampling of seed accounts, where the seed accounts are not associated with an actual recipient of the email campaign.

At step 102, subscriber deliverability data is received. Subscriber deliverability data includes information indicating a number of email messages associated with the email campaign that are delivered to a folder associated with the one or more intended recipients of the email campaign based on one or more subscriber accounts, where the seed accounts are associated with a subset of actual recipients of the email campaign.

According to one embodiment, subscriber deliverability data may be obtained using the following process. First, senders insert a matching ID into email message headers and deploy messages to both a subscriber/recipient list and a seed list.

Next, a set of regular expressions is run against all of the messages received to the seed accounts in order to parse the matching ID from the message and can be used, in combination with seed accounts, to uniquely identify a campaign and assign campaigns (i.e., email messages associated with a campaign) to a specific sender. Seed accounts, or reference accounts, are special email addresses or "seeds" that are unique to each sender. It is then possible to assign entire campaigns to specific customers based on these reference accounts. It is appreciated that these regular expressions may be applied hourly, daily, or any other suitable time. Shown below in Table 1 is a list of exemplary regular expressions that may be used for each of these matching IDs. The list of regular expressions are applied to every message to determine the Matching ID. The regular expression looks at each X-header in the email and if it finds a match it pulls out the set of values from that X-header that becomes the matching ID.

Next, the system may run the same set of regular expressions as above against all of the messages it receives in order to parse matching IDs from the message and then assign folder placement data to each matching ID (i.e., campaign), where there is overlap between to two lists of matching IDs generated.

Next, matched campaigns are matched to the originating campaign. Multiple post requests may be sent in a predetermined time period in order to obtain all the available data on the list of matching IDs. Placement data for one campaign can then be split across multiple posts, where all of the folder placement data for each campaign may be aggregated across all the posts.

Exemplary campaign data is shown below in Table 3:

TABLE 3

{"matching_id":"893623$","yahoo_trash_count":1,"campaign_group":"D2","mail_campaign_id":"2003523400024","yahoo_received_dt":1327981740}
{"matching_id":"1422209$","campaign_group":"D2","mail_campaign_id":"2003613900024","yahoo_received_dt":1327988454,"yahoo_ib_count":22}
{"matching_id":"1-1-7590282695156840","yahoo_trash_count":30,"aol_ib_count":1,"aol_received_dt":1327990611,"gmail_received_dt":1327990223,"yahoo_spam_count":17,"campaign_group":"D2","mail_campaign_id":"2003640100024","yahoo_received_dt":1327990142,"gmail_ib_count":18,"yahoo_ib_count":1387}
{"matching_id":"1109817838$","yahoo_spam_count":2,"gmail_received_dt":1327990834,"campaign_group":"D2","mail_campaign_id":"2003645600024","yahoo_received_dt":1327990288,"gmail_ib_count":1,"yahoo_ib_count":4}
{"matching_id":"893808$","yahoo_trash_count":2,"yahoo_spam_count":36,"campaign_group":"D2","mail_campaign_id":"2003588200024","yahoo_received_dt":1327986122,"yahoo_ib_count":38}

Exemplary regular expressions may include:

TABLE 1

(?mi-xs:rpcampaign:\s*?([a-z]+[\d_]{2,255})\s*?)
(?mi-xs:rpcampaign:\s*?([a-z]+[\d_]{2,255})\s*?)
(?mi-xs:rpcampaign:\s*?([a-z]+[\d_]{2,255})\s*?)
(?-sx:X-campaignid:\s(C\.\d+-J\.\d+-S\.\d+-SS\.\d+))
(?m-six:X-campaignid:\scduniverse(\d+))
(?m-xis:X-Offer-ID:\s(\d+))
(?m-xis:X-Offer-ID:\s(\d+))
(?m-ixs:X-Roving-CampaignId: (\d+))
(?mi-xs:rpcampaign:\s*?([a-z]+[\d_]{2,255})\s*?)
(?mis-x:^x-job:\s(\d+_\d+)$)

Next, the system generates a list of matching IDs that have been parsed from client messages to the seed accounts, for example in the previous 24 hours, and combines that seed data with subscriber data (i.e., folder placement data obtained from real subscribers) for the same matching ID.

TABLE 2

| mail_campaign_id | matching id |
|---|---|
| 1671281700023 | 132758100166420 |
| 1671281800023 | Kijiji.it-Subscription-1327581001 |
| 1671281900023 | appdd14d8fa4c9d4a35ba87eb6f30de375e |
| 1671282000023 | GSI_TOYSRUSFR-268899-2 |

Table 2 is a non-limiting example of various matching IDs. The first field is the mail_campaign_id which is an internal ID used by the system for uniquely identifying a campaign. This is the primary key for the campaigns within the system. The second field is the Matching ID which is an external ID used by the system for uniquely identifying a campaign and is a unique string that is derived from the X-header in the message using the regular expressions. This string is what data providers use to send the system the folder placement or deliverability data.

Table 3 is an example of the file that a data provider sends back to the system with the deliverability information/folder placement data. It can be appreciated that the matching IDs match between the two files to make it easy to see the relationship in the data. The various fields within the file are described in greater detail below. The matching_id refers to a Matching ID recorded from the list of regular expressions. For instance, the yahoo_trash_count refers to a Trash count or a number of messages moved from the inbox to the trash folder at the ISP Yahoo! for this campaign and time period. The yahoo_spam_count refers to a Spam count that includes a number of messages placed in the spam folder at Yahoo! for this campaign and time period. The campaign_group refers to a data center or environment that the campaign is associated with within the system. It is appreciated that both single and multi-data center configurations are possible without departing from the scope of the subject matter described herein. The mail_campaign_id is the internal campaign id that is provided as part of the campaign_list data. The yahoo_received_dt refers to a date/time stamp when the campaign was recorded. The yahoo_ib_count refers to an inbox count that includes a number of messages placed in the inbox at Yahoo! for this campaign and time period.

In one possible embodiment, if the number of mailboxes from which folder placement data is received is greater than a predetermined threshold value (e.g., 10), then the subscriber data may be automatically used in place of seed data for a given ISP.

Lastly, campaigns with seed-based and/or subscriber-based folder placement data are saved in a database and exported into, for example, a software-as-a-service (SaaS) application for viewing by senders.

At step 104 of FIG. 1, one or more deliverability metrics are determined based on both the seed deliverability data and the subscriber deliverability data. Examples of deliverability metrics may include determining whether one or more of the actions listed below are performed on email messages associated with a campaign. Additionally, as used herein, the following terminology may be used. An inbox refers to the default, primary folder that stores delivered email messages within a mailbox provider. A "junk" or "bulk" email folder is an inbox-alternative folder, within a mailbox provider, that stores email messages that are, for various reasons or rationale, unable to be delivered to the inbox. Bounce may refer to an email that cannot be delivered to the mailbox provider and is sent back to the email service provider that sent it. A bounce is classified as either "hard" or "soft." Hard bounces are the failed delivery of email due to a permanent reason, such as a non-existent address. Soft bounces are the failed delivery of email due to a temporary issue, such as a full inbox or an unavailable ISP server.

Overall deliverability metrics of a campaign may refer to metrics such as "Email Sent", "Email Delivered" and "Email Inbox Delivered" and can provide insight into the overall deliverability rates of a campaign. An email sent metric describes how many messages were in the queue before any delivery attempts were made and after any necessary internal suppression has been performed. An email delivered metric describes how many emails were completely transferred to the intended recipient's mailbox provider without generating a "bounce" or other delivery error. This metric may be calculated before the impact of content-based filtering is factored in. If a message is rejected by the ISP, it does not count as delivered. However, if the message is accepted and placed in a "junk email" folder it may count as delivered. An email inbox delivered metric uses an estimation based on delivery to one or more seed and/or subscriber accounts. The metric is calculated by subtracting any messages that do not appear in the inbox from the total number of emails delivered.

Although not all email messages are intended to drive a purchase, most messages have some "call to action," such as a click-through or confirmation. If these kinds of conversions are an applicable metric of success, then an email conversion metric attempts to answer the question, "How many registrations, purchases, or other actions were taken as a direct result of this Email campaign?" This metric may be expressed as a whole number or as a percentage.

In addition to deliverability metrics described above which may be associated with actions taken on email before delivery, other deliverability metrics such as branding, long-term deliverability, and compliance may consider actions taken on delivered email. For example, an email unsubscribe requests metric or an email complaints metric attempts to answer the question, "How many people actively clicked a link in their Email software to Report [this as] "Spam" or Report [this as] "Junk"?"

Figure 2:
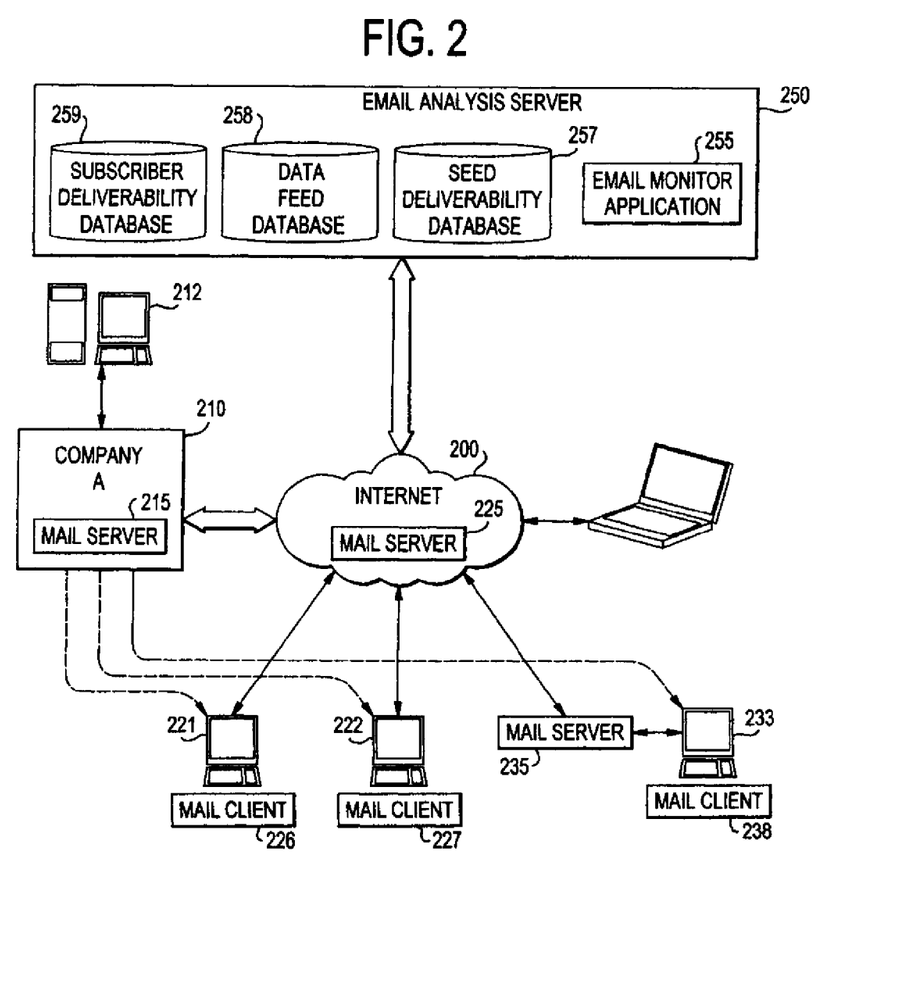
FIG. 2 is a diagram of an exemplary system for monitoring deliverability of electronic mail based on subscriber and seed deliverability data in accordance with an embodiment of the invention.

FIG. 2 is a diagram of an exemplary system for monitoring delivery of electronic mail based on subscriber and seed deliverability data in accordance with an embodiment of the invention. Referring to FIG. 2, a sender at computer system 212 may compose an email message to send to multiple recipients, including users of computer systems 221, 222, and 233. When the sender at computer system 212 completes the email message and sends it, the email message is transported to mail server 215.

Mail server 215 parses the header information on the email message to determine where to send the email message. The body of an email message includes the content of the message targeted to the recipient of the email. The headers of an email message are targeted to the applications handling the delivery of the email. After parsing the email headers, email server 215 delivers the email message to email servers used by the users of computer systems 221, 222, and 233. In this example, mail server 215 sends to the email message to mail server 225 and mail server 235.

Users of computer systems 221, 222, and 233 can access the email messages by accessing their local mail server. Local email client programs on computer systems 221, 222, and 233 may create local copies of the email message. Alternatively, the users of computer systems 221, 222, and 233 may use a web server-based email system that allows a user to access email on a mail server using a standard web browser on the local computer system.

FIG. 2 also illustrates a diagrammatic representation of a computer system (email analysis server) 250 within which a set of instructions may be executed for causing the machine to perform any one or more of the methodologies discussed herein. In alternative embodiments, the computer may operate as a standalone device or may be connected (e.g., networked) to other machines. In a networked deployment, the computer may operate in the capacity of a server or a client machine in server-client network environment, or as a peer machine in a peer-to-peer (or distributed) network environment. The computer may be a personal computer (PC), a tablet PC, a set-top box (STB), a Personal Digital Assistant (PDA), a cellular telephone, a web appliance, a network server, a network router, a network switch, a network bridge, or any computer capable of executing a set of instructions (sequential or otherwise) that specify actions to be taken by that computer. Further, while only a single computer (e.g., email analysis server 250) is illustrated in FIG. 2, the terms "computer" or "server" shall also be taken to include any collection of computers that individually or jointly execute a set (or multiple sets) of instructions to perform any one or more of the methodologies discussed herein.

The computer system 250 illustrated in FIG. 2 includes a processor (e.g., a central processing unit (CPU), a graphics processing unit (GPU) or both), one or more storage devices (e.g., a main memory and a static memory) such as databases 257-259, which communicate with each other via a bus. The computer system 250 may further include a video display adapter that drives a video display system such as a Liquid Crystal Display (LCD) or a Cathode Ray Tube (CRT). The computer system 250 may also include an alphanumeric input device (e.g., a keyboard), a cursor control device (e.g., a mouse or trackball), a disk drive unit, a signal generation device (e.g., a speaker), and a network interface device.

The subscriber deliverability database 259, the seed deliverability database 257, and the email monitor application 255 may include computer-readable media on which is stored one or more sets of computer instructions and data structures (e.g., software) embodying or utilized by any one or more of the methodologies or functions described herein. The computer-executable instructions may also reside, completely or at least partially, within the main memory and/or within the processor during execution thereof by the computer system 250.

The term "computer-readable medium" is understood to include a single medium or multiple media (e.g., a centralized or distributed database, and/or associated caches and servers) that store the one or more sets of instructions. The term "computer-readable medium" shall also be understood to include any tangible medium that is capable of storing, encoding, or carrying a set of non-transitory instructions for execution by the computer and that cause the computer to perform any one or more of the methodologies described herein, or that is capable of storing, encoding, or carrying data structures utilized by or associated with such a set of instructions. The term "computer-readable medium" shall accordingly be taken to include, but not be limited to, solid-state memories and optical and/or magnetic media.

The email analysis server 250 includes an email monitor application 255, a seed deliverability database 257, data feed database 258, and a subscriber deliverability database 259. The seed deliverability database 257 is configured for receiving and storing seed deliverability data that includes information indicating a number of email messages associated with an email campaign that are delivered to a folder associated with one or more intended recipients of the email campaign based on a sampling of seed accounts, wherein the seed accounts are not associated with actual recipients of the email campaign.

The data feed database 258 includes deliverability data received directly from Internet service providers, email service provider, hosting providers, security companies, or other companies which receive large volumes of email.

The subscriber deliverability database 259 is configured for receiving and storing subscriber deliverability data that includes information indicating a number of email messages associated with the email campaign that are delivered to a folder associated with the one or more intended recipients of the email campaign based on one or more subscriber accounts, wherein the seed accounts are associated with a subset of actual recipients of the email campaign. It is appreciated that the seed accounts and/or the subscriber account may be associated with a plurality of different email service providers (ESPs). In one embodiment, the subscriber deliverability database 259 is configured to receive subscriber deliverability data from a plugin configured to communicate with an email program of the recipient.

The email monitor application 255 is configured for determining one or more deliverability metrics based on the seed deliverability data and the subscriber deliverability data. In one embodiment, the email monitor application 255 is configured to match subscriber campaigns associated with campaign senders by parsing a matching ID included in an email header. For example, the matching ID includes an x-header value and the matching ID uniquely represents a campaign. The email monitor application 255 may match a subscriber campaign to a seeded campaign by determining a list of matching IDs associated with the seeded campaign and matching the matching IDs with the subscriber campaign. It is appreciated that the email monitor application 255 is configured to perform the matching in real-time or near real-time. The email monitor application 255 may also be configured to display the deliverability metrics.

In another embodiment, the email monitor application 255 may be configured to determine the one or more deliverability metrics based on one of the subscriber data exclusively or the seed data exclusively, for an ISP, in the event that the number of mailboxes from which folder placement data is received is greater than or less than a predetermined threshold value. Finally, the email monitor application 255 may be configured to receive deliverability data associated with the email campaign directly from one of an internet service provider (ISP) and an email service provider (ESP). For example, the system may receive a feed from ISPs such as Yahoo! and Comcast that includes actual deliverability data by IP address. It is appreciated that this data feed could be modified to include campaigns or X-headers which could be used in addition to the seed and subscriber data without departing from the scope of the subject matter described herein.

Figure 3:
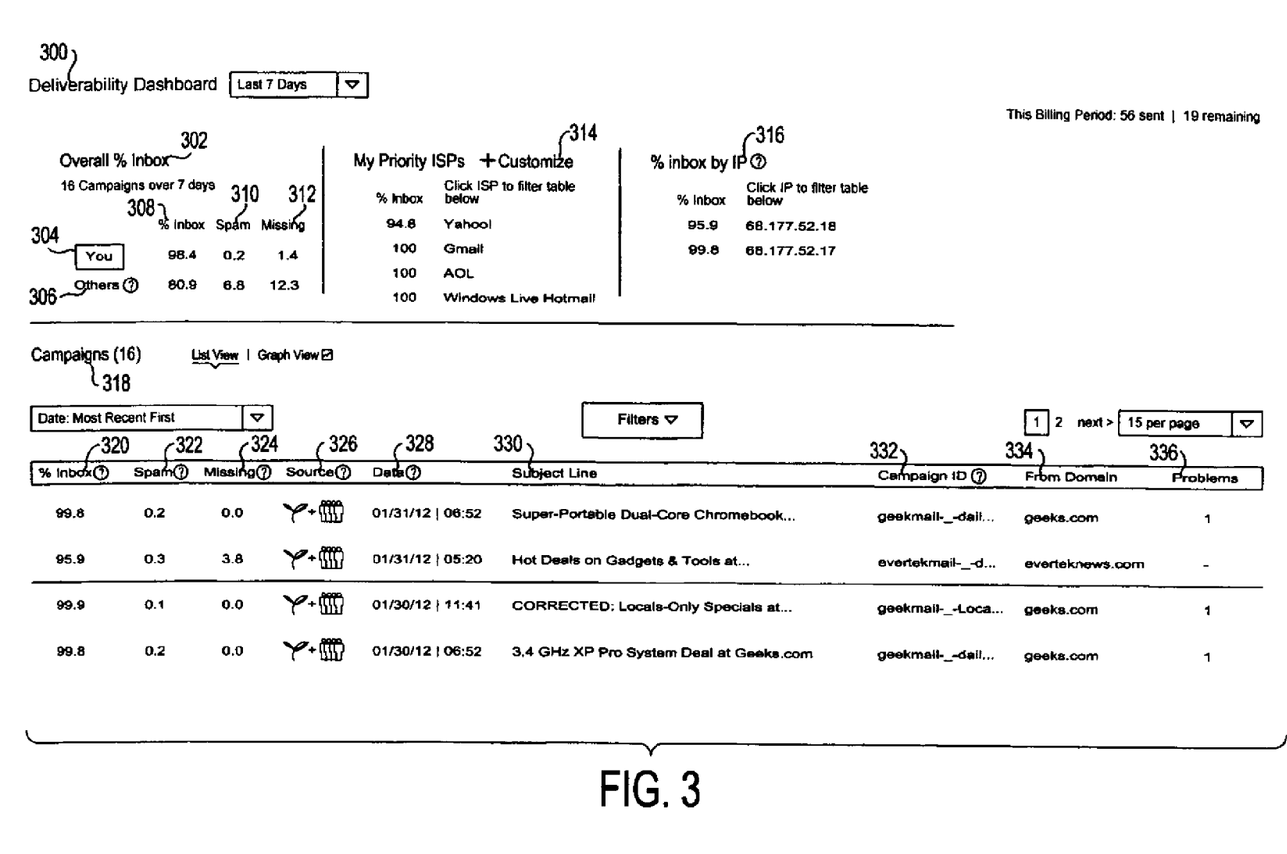
FIG. 3 is an exemplary screenshot of a deliverability dashboard application for displaying subscriber and seed deliverability data in accordance with an embodiment of the subject matter described herein.

FIG. 3 is an exemplary screenshot of a deliverability dashboard application for displaying subscriber and seed deliverability data according to an embodiment of the subject matter described herein. The information shown in FIG. 3 may be stored in databases 257 and 258 of FIG. 2 and may be processed and displayed to the user by email monitor application 255 as part of email analysis server 250. Referring to FIG. 3, the deliverability dashboard view 300 may present various deliverability information to a user, such as a sender of an email campaign, for helping to analyze the success of an email campaign based on a combination of subscriber deliverability data and seed deliverability data. Screen portion 302 may indicate a summary of the user's 304 campaign(s) as compared with other users' 306 campaigns based on a desire metric, such as a percentage of emails that were delivered to intended recipients' inboxes in column 308, emails delivered to spam folders in column 310, or emails filtered by the ISP (i.e., missing) in column 312. For example, summary screen portion 302 indicates that 98.4% of the emails associated with the sender 304 were delivered to recipients' inbox folders while only 80.9% of the emails associated with the sender 306 were delivered to recipients' inbox folders. Additionally, summary screen portion 302 indicates that 0.2% of the emails associated with the sender 304 were delivered to recipients' spam folders while 6.8% of the emails associated with the sender 306 were delivered to recipients' spam folders. Finally, summary screen portion 302 indicates that 1.4% of the emails associated with the sender 304 were automatically filtered by the recipients' ISP before reaching any end-user folder while 12.3% of the emails associated with the sender 306 were filtered by ISPs, and therefore were missing.

Screen portion 314 lists the sender's priority ISPs based on one of, for example, sender-defined criteria, a number of recipients associated with each ISP, or a percentage of emails which are successfully delivered to recipients' inboxes. Screen portion 316 indicates a percentage of emails that reach recipients' inbox folders associated with IP addresses. The list shown in screen portion 316 may likewise be sortable either manually or automatically.

Screen portion 318 indicates information regarding any campaigns associated with the sender. For example, column 320 may indicate the percentage of emails that were delivered to recipients' inbox for each individual campaign. Column 322 may indicate the percentage of emails that were delivered to recipients' spam folders for each individual campaign. Column 324 may indicate the percentage of emails that were automatically filtered by the recipients' ISP for each individual campaign.

Column 326 indicates whether the deliverability statistics displayed are based on subscriber data only, seed data only, or a combination of subscriber and seed data. For example, a first icon (left) may indicate seed data, a second icon (right) may indicate subscriber data, and a combination of both icons (e.g., using a+symbol) may indicate that both subscriber and seed data are used. In one embodiment, an "either-or" decision may be performed at the ISP level for determining whether seed, subscriber, or direct ISP feed data should be used as the basis for determining deliverability metrics. For example, if Yahoo! has more than a threshold number of subscriber data points, then seed deliverability is not used at all. Alternatively, seed and subscriber data may be combined the together. However, in the present embodiment, either subscriber data or seed data is used at the ISP level. Then, the data is averaged across all ISPs to determine the total deliverability metrics. Thus, an ISP such as Yahoo! with thousands of subscriber data points wouldn't change the overall deliverability number any more than Yahoo! with 10 seeds or 20 seeds because ISPs are all treated equally for the deliverability metrics. In another possible embodiment, "domain weighting" may be used which allows a sender to weight different domains differently so that if Yahoo! is associated with 40% of the recipients of a campaign, regardless of seeds or subscribers, 40% of overall deliverability is determined using the Yahoo! ISP deliverability metrics.

Column 330 indicates a subject line associated with each email campaign. This may be important to senders and for analyzing why certain campaigns were more successful than others because ISPs may deliver messages differently based on key word examination of the subject line of the messages. For example, emails with keywords such as sex or Viagra may either be automatically delivered to a spam folder or deleted. Column 332 includes a listing of the campaign ID, or matching ID, associated with each campaign. This allows the same message with slightly different subject lines to be combined for the purposes of deliverability. So, if the sender thinks "Thank you TOM for your purchase" and "Thank you BOB for your purchase" are all "Thank you" emails with the same X-header, that data can be treated together as part of the same campaign and the subject line can be used for the first messages sent to seeds as the "subject line" for purposes of the display. This is one of the advantages of combining the data and using the X-headers for distinct campaigns. It reduces the need for "depersonalization." It is further appreciated that the subject matter described herein is not limited to combining seed and subscriber deliverability data based solely on the matching ID. Rather, a combination of a "From Domain," a "Subject line," and/or an IP address may also be used to combine the two or more sources of data without departing from the scope of the subject matter described herein. Column 334 may indicate a sender domain associated with each campaign. For example, a first sender may be associated with the domain geeks.com and have multiple campaigns associated with that same domain. However, the dashboard 300 may also display information for senders associated with other domains, such as everteknews.com. Finally, column 336 may indicate if there are any problems associated with a campaign.

Figure 4:
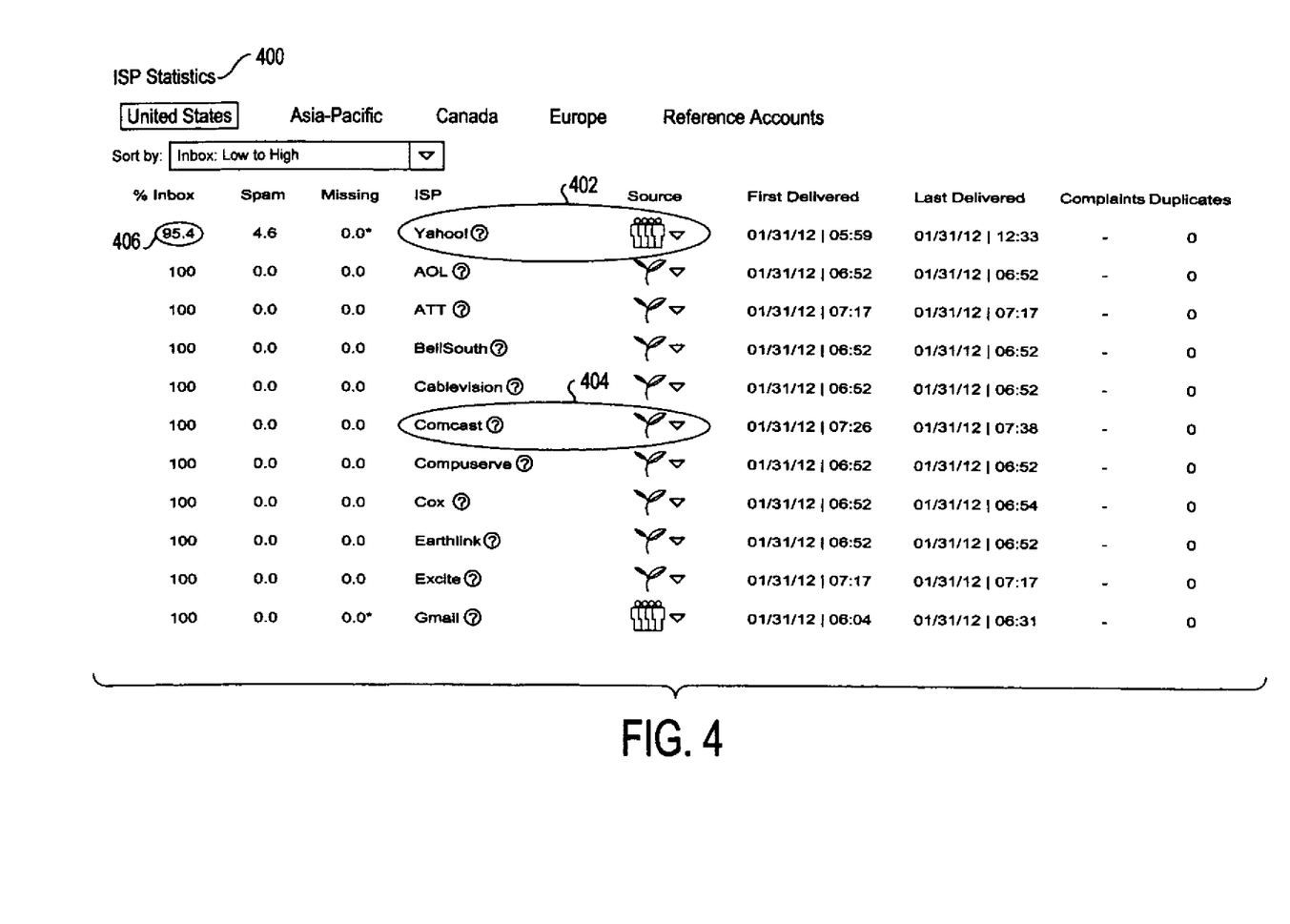
FIG. 4 is an exemplary screenshot of a deliverability dashboard application for displaying internet service provider (ISP) statistics including deliverability data based on seed and subscriber data in accordance with an embodiment of the subject matter described herein.

FIG. 4 is an exemplary screenshot of a deliverability dashboard application for displaying ISP statistics including deliverability data based on seed and subscriber data in accordance with an embodiment of the subject matter described herein. Referring to FIG. 4, ISP statistics view 400 may display deliverability and other ISP-related statistics. For international ISPs, this information may be divided, for example, by geographical regions such as the United States, Asia-Pacific, Canada, and Europe. Screen portion 402 indicates that for the ISP Yahoo!, the deliverability metrics displayed are based on subscriber data only. In contrast, screen portion 404 indicates that for the ISP Comcast, the deliverability metrics displayed are based on seed data only. As described above, in one possible embodiment, if the number of mailboxes from which folder placement data is received is greater than a predetermined threshold (e.g., 10), then the subscriber data may be automatically used in place of seed data for a given ISP. However, it is appreciated that in other possible embodiments, both seed data and subscriber data may be combined for determining deliverability metrics. Screen portion 406 indicates that, for the ISP Yahoo!, 98.4% of the emails were delivered to recipients' inbox folders while 4.6% were delivered to spam folders and 0% were "missing". This data may be used by the sender to compare the deliverability performance of different ISPs for a campaign.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method for monitoring deliverability of electronic mail based on subscriber and seed deliverability data, the method comprising:
   receiving at a seed deliverability storage database, seed deliverability data that includes information indicating a number of email messages associated with an email campaign that are delivered to a folder associated with one or more intended recipients of the email campaign based on a sampling of seed accounts, wherein the seed accounts are not associated with human recipients of the email campaign;
   receiving at a subscriber deliverability storage database, subscriber deliverability data that includes information indicating a number of email messages associated with the email campaign that are delivered to a folder associated with the one or more intended recipients of the email campaign based on one or more subscriber accounts, wherein the subscriber accounts are associated with a subset of actual recipients of the email campaign;
   determining at a processor, one or more deliverability metrics based on the seed deliverability data and the subscriber deliverability data; and
   matching at the processor a subscriber campaign to a seeded campaign by determining at the processor a list of matching IDs associated with the seeded campaign and matching at the processor the matching IDs with the seeded campaign.

2. The method of claim 1 further comprising matching subscriber campaigns associated with campaign senders by parsing a matching ID included in an email header.

3. The method of claim 2 wherein the matching is performed in real-time or near real-time.

4. The method of claim 1 wherein determining one or more deliverability metrics includes using at least one of a domain, a subject line, or an IP address to combine the seed deliverability data and the subscriber deliverability data.

5. The method of claim 1 wherein the matching ID includes an x-header value.

6. The method of claim 1 further comprising displaying the deliverability metrics.

7. The method of claim 1 further comprising receiving deliverability data associated with the email campaign directly from one of an internet service provider (ISP) and an email service provider (ESP).

8. The method of claim 1 wherein the subscriber deliverability data is obtained using a plugin configured to communicate with an email program of the recipient.

9. The method of claim 1 wherein each matching ID uniquely represents a campaign.

10. The method of claim 1 further comprising automatically using one of subscriber data exclusively or seed data exclusively, for an ISP, in the event that the number of mailboxes from which folder placement data is received is greater than or less than a predetermined threshold value.

11. A non-transitory computer-readable medium that is not a signal, the medium having stored thereon computer executable instructions that when executed by the processor of a computer perform steps comprising:
   receiving seed deliverability data that includes information indicating a number of email messages associated with an email campaign that are delivered to a folder associated with one or more intended recipients of the email campaign based on a sampling of seed accounts, wherein the seed accounts are not associated with human recipients of the email campaign;

receiving subscriber deliverability data that includes information indicating a number of email messages associated with the email campaign that are delivered to a folder associated with the one or more intended recipients of the email campaign based on one or more subscriber accounts, wherein the subscriber accounts are associated with a subset of actual recipients of the email campaign;

determining one or more deliverability metrics based on the seed deliverability data and the subscriber deliverability data; and matching at the processor a subscriber campaign to a seeded campaign by determining at the processor a list of matching IDs associated with the seeded campaign and matching at the processor the matching IDs with the seeded campaign.

12. A system for monitoring deliverability of electronic mail based on subscriber and seed deliverability data, the system comprising:

a seed deliverability storage database for receiving and storing seed deliverability data that includes information indicating a number of email messages associated with an email campaign that are delivered to a folder associated with one or more intended recipients of the email campaign based on a sampling of seed accounts, wherein the seed accounts are not associated with actual recipients of the email campaign;

a subscriber deliverability storage database for receiving and storing subscriber deliverability data that includes information indicating a number of email messages associated with the email campaign that are delivered to a folder associated with the one or more intended recipients of the email campaign based on one or more subscriber accounts, wherein the subscriber accounts are associated with a subset of human recipients of the email campaign; and a processor device configured to determine one or more deliverability metrics based on the seed deliverability data and the subscriber deliverability data, wherein the processor device is configured to match a subscriber campaign to a seeded campaign by determining a list of matching IDs associated with the seeded campaign and matching the matching IDs with the seeded campaign.

13. The system of claim 12 wherein the processor device is configured to match subscriber campaigns associated with campaign senders by parsing a matching ID included in an email header.

14. The system of claim 13 wherein the processor device is configured to perform the matching in real-time or near real-time.

15. The system of claim 12 wherein the processor device is configured to use at least one of a domain, a subject line, or an IP address to combine the seed deliverability data and the subscriber deliverability data.

16. The system of claim 12 wherein the matching ID includes an x-header value.

17. The system of claim 12 wherein the processor device is configured to display the deliverability metrics.

18. The system of claim 12 wherein the processor device is configured to receive deliverability data associated with the email campaign directly from one of an internet service provider (ISP) and an email service provider (ESP).

19. The system of claim 12 wherein the subscriber deliverability storage database is configured to receive subscriber deliverability data from a plugin configured to communicate with an email program of the recipient.

20. The system of claim 12 wherein the matching ID uniquely represents a campaign.

21. The system of claim 12 wherein the processor device is configured to determine the one or more deliverability metrics based on one of the subscriber data exclusively or the seed data exclusively, for an ISP, in the event that the number of mailboxes from which folder placement data is received is greater than or less than a predetermined threshold value.

* * * * *